United States Patent
Hamlin et al.

(10) Patent No.: US 11,194,374 B2
(45) Date of Patent: Dec. 7, 2021

(54) SYSTEMS AND METHODS FOR WAKING AN INFORMATION HANDLING SYSTEM FROM A WIRELESS PERIPHERAL DEVICE

(71) Applicant: DELL PRODUCTS L.P., Round Rock, TX (US)

(72) Inventors: Daniel L. Hamlin, Round Rock, TX (US); Yagiz C. Yildiz, Austin, TX (US); Manuel Novoa, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 106 days.

(21) Appl. No.: 16/526,528

(22) Filed: Jul. 30, 2019

(65) Prior Publication Data

US 2021/0034132 A1 Feb. 4, 2021

(51) Int. Cl.
*G06F 1/3209* (2019.01)
*G06F 1/26* (2006.01)
*G06F 13/12* (2006.01)
*G06F 13/10* (2006.01)
(Continued)

(52) U.S. Cl.
CPC ............ *G06F 1/3209* (2013.01); *G06F 1/266* (2013.01); *G06F 1/3215* (2013.01); *G06F 1/3287* (2013.01); *G06F 13/102* (2013.01); *G06F 13/128* (2013.01); *Y02D 10/00* (2018.01)

(58) Field of Classification Search
CPC ...... G06F 1/266; G06F 1/3203; G06F 1/3206; G06F 1/3209; G06F 1/3215; G06F 1/3231; G06F 1/3234; G06F 1/3287; G06F 13/102; G06F 13/128; G06F 21/575; G06F 1/3293; H04W 4/80; H04W 52/0225;
(Continued)

(56) References Cited

U.S. PATENT DOCUMENTS 9,853,748 B2  12/2017  Prendergast et al.
2011/0021142 A1 * 1/2011 Desai ................. H04W 8/005
                                             455/41.2
(Continued)

OTHER PUBLICATIONS

Idil, Rida. "BLE Series Part 1: A Brief Overview of Bluetooth Low Energy". Medium. Online Oct. 23, 2018. Retrieved from Internet Jan. 6, 2021. <https://medium.com/rtone-iot-security/a-brief-overview-of-bluetooth-low-energy-79be06eab4df>. (Year: 2018).*
(Continued)

*Primary Examiner* — Thomas J. Cleary
(74) *Attorney, Agent, or Firm* — Egan, Enders & Huston LLP.

(57) ABSTRACT

Systems and methods are provided that may be implemented to wake an information handling system from a reduced-powered state in response to a wireless signal wake-up event received from a wireless peripheral device. Non-operating system (OS) components and/or non-BIOS components of an information handling system may be optionally enabled to securely perform pre-OS operations to determine whether or not to wake other components (e.g., such as a system OS and/or system BIOS executing on a host processing device or embedded controller) of the information handling system from a reduced-powered state upon receipt of the wireless signal wake-up event.

27 Claims, 5 Drawing Sheets

(51) Int. Cl.
*G06F 1/3215* (2019.01)
*G06F 1/3287* (2019.01)

(58) Field of Classification Search
CPC .......... H04W 52/0229; H04W 52/0235; Y02D 10/00; H04M 1/72448; H04M 1/72412
See application file for complete search history.

(56) References Cited

U.S. PATENT DOCUMENTS

| | | | | |
|---|---|---|---|---|
| 2011/0055538 | A1* | 3/2011 | Cho | H04N 21/4432 713/2 |
| 2011/0185208 | A1* | 7/2011 | Iwamoto | G06F 1/3203 713/323 |
| 2012/0040623 | A1* | 2/2012 | Liu | H04W 52/0241 455/67.13 |
| 2013/0285911 | A1* | 10/2013 | Nissen | G06F 1/3206 345/163 |
| 2015/0296073 | A1* | 10/2015 | Lo | H04W 52/0235 455/41.2 |
| 2015/0347738 | A1* | 12/2015 | Ulrich | G06F 21/35 726/17 |
| 2015/0351038 | A1* | 12/2015 | Dooley | H04W 52/0229 455/41.2 |
| 2016/0183164 | A1* | 6/2016 | Pelkey | H04W 4/023 455/456.1 |
| 2016/0313822 | A1 | 10/2016 | Krishnakumar et al. | |
| 2017/0187523 | A1 | 6/2017 | Andrews et al. | |
| 2017/0208639 | A1* | 7/2017 | Lee | H04W 72/0406 |
| 2018/0103229 | A1* | 4/2018 | Yang | H04W 76/10 |
| 2019/0068772 | A1* | 2/2019 | Lo | H04W 4/80 |
| 2019/0166635 | A1* | 5/2019 | McColgan | H04W 12/0013 |
| 2020/0029277 | A1* | 1/2020 | Lin | H04W 52/0229 |
| 2020/0077339 | A1* | 3/2020 | Nezamfar | H04L 5/10 |

OTHER PUBLICATIONS

Delaere, Joe, et al. "Top 7 Reasons to Replace Your Microcontroller with a MAX® 10 FPGA". Intel Corporation. 2017. (Year: 2017).*
Noble, Jr., A.S. "Design of an integrated programming and operating system Part I: System considerations and the monitor". IBM Systems Journal. Jun. 1963. pp. 153-161. (Year: 1963).*
Jex, Jerry. "Flash Memory BIOS for PC and Notebook Computers". IEEE. 1991. (Year: 1991).*
Mikulenas, Mantas. "Bluetooth link keys on dual-boot systems". Online Sep. 2015. Retrieved from Internet Apr. 23, 2021. < https://nullroute.eu.org/~grawity/bluetooth-key-sharing.html>. (Year: 2015).*
Howe, Denis. "The Free On Line Dictionary of Computing". Entry 'operating system'. Online Jun. 9, 1999. Retrieved from Internet Apr. 23, 2021. <http://foldoc.org/operating+system>. (Year: 1999).*
Howe, Denis. "The Free On Line Dictionary of Computing". Entry 'Basic Input/Output System'. Online Jun. 9, 1999. Retrieved from Internet Apr. 23, 2021. <http://foldoc.org/bios>. (Year: 1999).*
Wikipedia, "Bluetooth Low Energy" retrieved from the Internet on Jun. 12, 2019, 14 pages.
Harmony, "Harmony Remote User Manual," 17 pages, publicly available prior to the Jul. 30, 2019 filing date of the current patent application.
Falcone, "Harmony universal remotes: What's the best one for you?" Apr. 29, 2012, 7 pages.
Crider, "What is Wake-on-LAN, and How Do I Enable It?" Jul. 28, 2017, 10 pages.
Microsoft Doc Contributors, "Modern Standby," May 1, 2017, 2 pages.
Microsoft Doc Contributors, "Modern Standby wake sources," Oct. 25, 2018, 18 pages.
Wikipedia, "Near-field communication," retrieved from the Internet Jun. 9, 2019, 15 pages.
Addictivetip.com, "Set Bluetooth Device Discoverability in Windows 10," Jul. 20, 2015, 3 pages.
Wikipedia, "Windows Management Instrumentation" retrieved from the Internet Jun. 12, 2019, 8 pages.
Estrada "You know the Logitech Harmony remote and hub bundle everyone loves? It's back down to its lowest price ever," Jul. 12, 2019, 8 pages.

* cited by examiner

SYSTEMS AND METHODS FOR WAKING AN INFORMATION HANDLING SYSTEM FROM A WIRELESS PERIPHERAL DEVICE

FIELD

This invention relates generally to information handling systems and, more particularly, to wireless peripheral devices used with information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling systems become smaller and wireless connection possibilities continue to become prevalent, the wireless peripheral device ecosystem around such systems also grows. Bluetooth keyboards, pens and totems are wireless peripheral devices that are now commonly used to interface with information handling systems. Currently, systems with Bluetooth keyboards are restricted from accessing the system basic input/output system (BIOS) operations until there is a fully provisioned Bluetooth stack accessible after the system operating system (OS) is booted to execute commands of device drivers, network drivers, and direct communication drivers and services. Some current systems have power buttons that are not easily accessible by users such that the user cannot use a keyboard to initiate system level wake events.

In the past, information handling system level wake events have been enabled by mandating use of a physical power button for initiating a wake event, accomplishing system power on based on establishing external wired connection to a dedicated system universal serial bus (USB) port (i.e., utilizing wired connectivity), and using a wake on local area network (LAN) or wake on wireless LAN (WLAN) feature. Wake on LAN or WLAN techniques rely on receipt of a "magic packet" at the information handling system from a remote device that includes the media access control (MAC) address of the target system. When the information handling system network interface controller (NIC) receives and identifies a received packet as the "magic packet", it wakes the remainder of the system.

Windows 10 wake from Modern Standby has also been employed with Bluetooth devices. Windows 10 Modern Standby requires many information handling system components to remain powered "ON" (including the operating system (OS) executing on the central processing unit as well as the system Bluetooth stack and Bluetooth circuitry) when the system is in Deepest Runtime Idle Platform State (DRIPS) mode, and thus allows for constant communication with the system Bluetooth components and OS.

A universal remote control is available that employs an infrared (IR) repeater hub that receives Bluetooth radio frequency (RF) control signals from a handheld remote, and repeats these Bluetooth control signals as infrared signals to control an IR-capable device. The IR repeater hub is always fully powered and capable acting upon receiving Bluetooth signal notification from the remote control. This type of universal remote utilizes an authentication system which is networked and tokens are delivered to any network device that wants to interact with the IR repeater hub. This token is distributed to the networked device upon user authentication.

SUMMARY

Disclosed herein are systems and methods that may be implemented to wake an information handling system from a reduced-powered state in response to a wireless signal wake-up event received from a wireless peripheral device, such as a wireless keyboard, wireless mouse, wireless game controller, wireless pen, wireless totem, wireless touchpad, wireless smart phone, etc. In one embodiment, the disclosed systems and methods may be implemented to securely enable non-operating system (OS) components and non-BIOS components of an information handling system to perform pre-OS operations to determine whether or not to wake other components (e.g., such as a system OS and/or system BIOS executing on a host processing device or embedded controller) of the information handling system from a reduced-powered state upon receipt of the wireless signal wake-up event. Examples of information handling systems with which the disclosed systems and methods may be implemented include, but are not limited to, a notebook or desktop computer, convertible or tablet computer, all-in-one computer, etc.

In one embodiment, the disclosed systems and methods may be implemented using two stages: 1) initial pairing between firmware or software of a given wireless peripheral device and BIOS and OS components of an information handling system, followed by 2) steady state wake to the OS or performance of a pre-OS operation, such as a diagnostics boot option transmitted via a wake event to control platform behavior on the wake. In such an embodiment, the initial pairing stage may be manually conducted by a human user of the information handling system, and may be performed at either the OS operating level or BIOS operating level of the information handling system. Once the given wireless peripheral device is paired with the information handling system, the paired device information of the wireless peripheral device is synchronized between the OS and BIOS of the information handling system.

In one embodiment, a steady state wake event (i.e., wake event occurring when the system is in a "steady state" or normal operating environment) may be initiated on a wireless peripheral device in response to a user input action provided to an input/output (I/O) feature of the wireless peripheral device. Examples of such a user input action include, but are not limited to, a manual user press of a keycap or mechanical button of a wireless keyboard device or game controller, manual touch of an active area of a wireless touchscreen device, manual click or movement of a wireless mouse across a surface, manual manipulation of wireless pen or wireless totem, etc. In such an embodiment, circuitry and logic (e.g., firmware and/or software) of a wireless peripheral device may be configured to respond to receipt of such a user input action by causing the wireless peripheral device to begin advertising by wirelessly transmitting advertising packets (e.g., Bluetooth advertising packets) from radio frequency (RF) transmitter circuitry of the wireless peripheral device.

In one embodiment, portion/s of an information handling system circuitry that execute the system OS and system BIOS (e.g., host processing device and embedded controller (EC)) may be turned "OFF" and not active whenever the information handling system is in a reduced-power state (e.g., such as one of Advanced Configuration and Power Interface (ACPI) Standby state (S3 or Modern Standby), Hibernation state (S4), or Soft Off state (S5)). At the same time, one or more other designated portion/s of the circuitry of the information handling system (that do not execute the system OS and BIOS) may be turned "ON" and active whenever the information handling system is in the reduced-power state. In this embodiment, these designated portion/s of the circuitry may be programmed to monitor for and identify transmitted advertising packets received from wireless peripheral devices.

Examples of designated circuitry portions that may remain active and "ON" during system reduced power mode include, but are not limited to, RF receiver circuitry (e.g., such as Bluetooth or other wireless protocol controller circuitry) programmed to receive and identify advertising packets from a wireless peripheral device, and proximity-sensing circuitry (e.g., such thermal sensor circuitry, acoustic sensor circuitry, near field communication (NFC) circuitry or Hall sensor circuity) that senses proximity of the wireless peripheral device and/or human user and causes circuitry of the information handling system to respond to sensed close proximity (e.g., within one or two feet or other predesignated greater or lesser distance) of the wireless peripheral device and/or user by turning on the RF receiver circuity to receive and identify advertising packets from a wireless peripheral device. In any case, only the designated circuity consumes power while the system is in the reduced-power state, while the host processing device and/or EC remain unpowered or in a reduced power-consuming state. This is in contrast to a conventional universal remote implementation in which the IR remote hub is always fully powered.

Once an advertising packet transmitted from a wireless peripheral device has been received by the active designated circuity of an information handling system, wireless communication and discovery may be established between the wireless peripheral device and the designated circuity of the information handling system. Once wireless communication and discovery has been so established between the wireless peripheral device and the reduced-power information handling system, then the wireless peripheral device may be allowed to directly wake other circuitry of the information handling system (e.g., such as host processing device and/or EC) without further authentication steps, or may be required to go through challenge/response (C/R) step/s (e.g., requiring successful exchange of device and user keys) prior to waking the other circuitry of the information handling system (e.g., such as by transitioning the information handling system from an existing ACPI reduced power state S3, S4 or S5 to an ACPI normal powered-on state (S0)).

In one embodiment, C/R steps may always be required, although in other embodiments C/R steps may be only selectively required under certain conditions based on a defined provisioning hierarchy level. For example, C/R steps may be selectively required for certain types of commands that require user physical presence, wireless peripheral presence and/or other authentication (e.g., such as system booting or system booting to a USB drive connected to an attached notebook or laptop docking station). In another example, C/R steps may be selectively required upon absence of a sensed nearby physical presence of a human user and/or wireless peripheral device (e.g., within one foot or other maximum distance threshold) to the information handling system, and/or may be selectively required when specified by existing user/device settings. In a further embodiment, device and user keys may be optionally protected by one or multiple biometric authentication methods.

In yet another embodiment, wireless peripheral device detection authentication may be provided and/or supplemented using proximity-sensing circuitry of an information handling system. For example, proximity (distance) of w wireless peripheral device to an information handling system may be determined via NFC wireless communication between a wireless peripheral device and the information handling system, via hall sensor detection of position of wireless peripheral device relative to the information handling system, via physical hardwire connection between circuitry of the wireless peripheral device and circuitry of the information handling system, etc. Proximity (distance) of a human user to an information handling system may be determined via thermal sensor circuity, acoustic sensor circuitry, etc. This would allow for device authentication with additional trust capabilities of physical presence to augment security constraints by requiring proximity of the wireless peripheral device to the information handling system to be within a maximum distance threshold (e.g., one or two feet) prior to allowing system wake up, or prior to allowing system wakeup without further authentication.

Features of the disclosed systems and methods that may be advantageously achieved (alone or together) in various embodiments include, but are not limited to, providing synchronized Bluetooth provisioned devices between OS and BIOS environments, and providing an ability to process wireless peripheral device RF (e.g., Bluetooth) wake events within an information handling system platform root of trust protected/segmented operating environment. For example, in the latter case, secured authentication verification of wireless peripheral device communication may be conditioned on presence of a device and/or user key of the wireless peripheral device.

For example, possible defined provisioning hierarchy levels that may be employed in some embodiments of the disclosed systems and methods include, but are not limited to, 1) Non-secure Hierarchy Level: only requires a wireless peripheral device to be provisioned—any wireless peripheral device can wake the information handling system as long as it's "paired" with the information handling system; 2) Secured/Validated Hierarchy Level: employs device key for C/R—only paired wireless peripheral devices presenting keys for C/R can wake the information handling system; and 3) User Secured/Validated Hierarchy Level: employs user key for C/R—only paired devices with device keys (C/R) and user keys (C/R) can wake the information handling system (user key may be optionally used for single sign on "SSO" purposes).

Other features of the disclosed systems and methods that may be advantageously achieved (alone or together) in various embodiments include, but are not limited to, ability for a single wireless peripheral device to wake/communicate with multiple information handling system endpoints; capability of remote management of wirelessly-paired peripheral devices (e.g., enable/disable/configure device and keys), device keys and user keys; and option to dynamically enable and modify wireless information handling system wake functionality via user presence and/or physical interactions between wireless peripheral device and an information handling system.

In one embodiment, root of trust (ROT) access to the information handling system and system hardware control may be provided as part of the process of waking an information handling system from a wireless peripheral device. This capability is not provided by conventional techniques, such as Windows 10 Modern Standby. Moreover, the disclosed systems methods may be implemented in one embodiment to secure input from remote wake events received from wireless peripheral devices, which is unlike conventional wake on LAN and WLAN methods in which a system wakes as long as it receives a "magic" packet corresponding to a magic wake event. In one embodiment of the disclosed systems and methods, user keys may be tied to a specific user and not just one or more tokens stored to any specific requesting device as is the case with conventional Harmony Remote implementation.

Advantageously, the disclosed systems and methods may be implemented in one embodiment to wake an information handling system from a wireless peripheral device without requiring physical access to a data port (e.g., wired connection to a USB port) of the information handling system. In another embodiment, the disclosed systems and methods may be implemented in manner that provides increased flexibility for system physical platform design compared to conventional techniques that require a system platform to be designed around a physical hardware implementation (e.g., such as a power button) for handling remote system wake events from a wireless peripheral device. In a further embodiment of the disclosed systems and methods, management of a key received by an information handling system from a wireless peripheral device also provides a mechanism to verify the key comes from a trusted party (e.g., via Bluetooth or other wireless device authentication).

In one respect, disclosed herein is a method, including: receiving a wireless advertising packet in an information handling system, the wireless advertising packet being a wireless input/output (I/O) wake request from a wireless peripheral device that is received at the same time that a basic input/output system (BIOS) and an operating system (OS) of the information handling system are not awake and not executing on the information handling system; and then waking and executing the BIOS and OS of the information handling system in response to receipt of the wireless I/O wake request from the wireless peripheral device.

In another respect, disclosed herein is a system, including: an information handling system including at least one programmable integrated circuit that is programmed to execute a basic input/output system (BIOS) and an operating system (OS); and a radio coupled between an antenna and the at least one programmable integrated circuit of the information handling system. The at least one programmable integrated circuit of the system may be programmed to: receive via the radio a wireless advertising packet as an input/output (I/O) wake request from a wireless peripheral device that is separate from the information handling system, the I/O wake request being received at the same time that the BIOS and OS of the information handling system are not awake and not executing on the information handling system; and then wake and execute the BIOS and OS of the information handling system in response to receipt of the wireless I/O wake request from the wireless peripheral device.

DESCRIPTION OF ILLUSTRATIVE EMBODIMENTS

Figure 1:
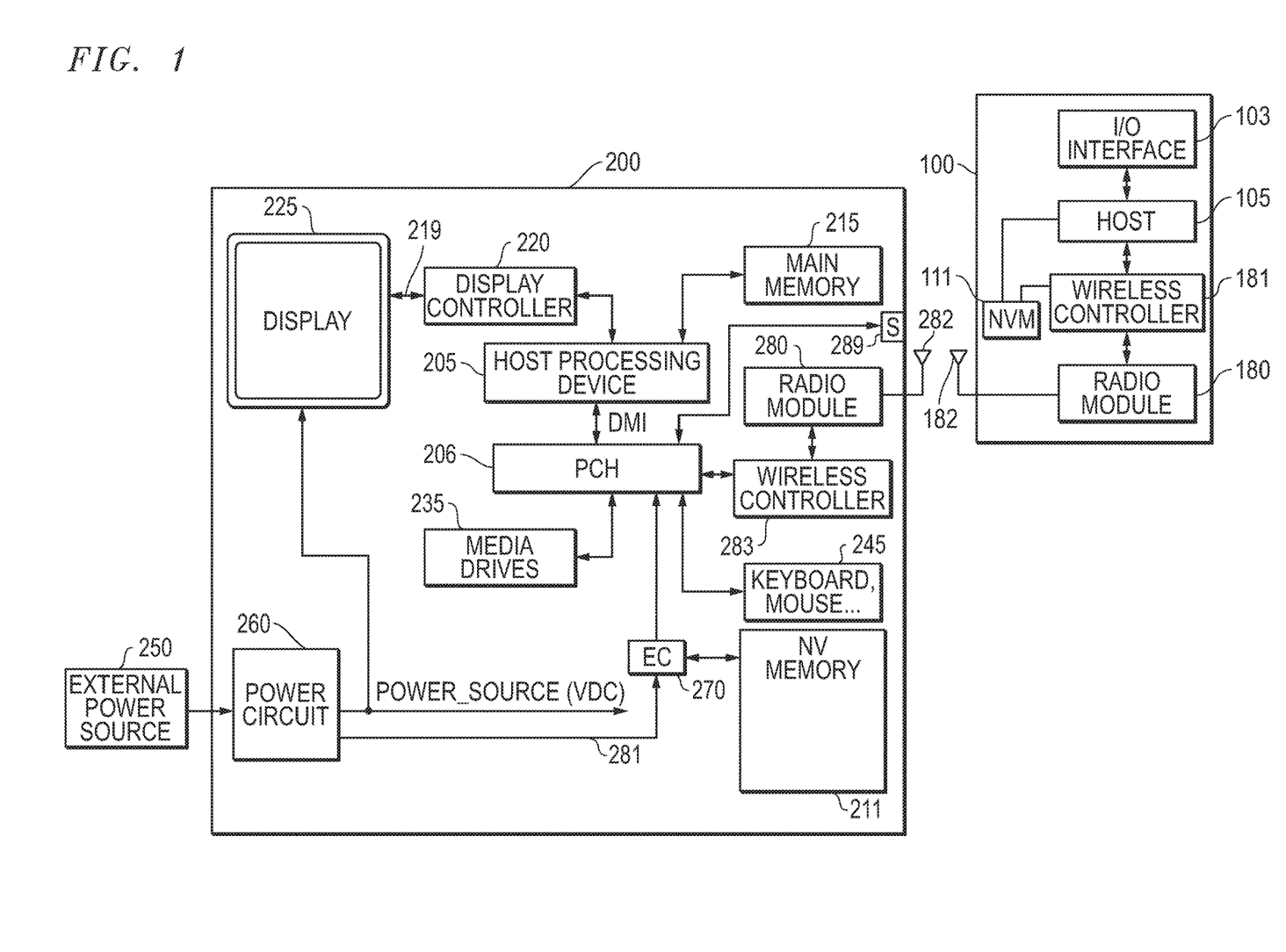
FIG. 1 is a block diagram of a wireless communication environment according to one exemplary embodiment of the disclosed systems and methods.

FIG. 1 is a block diagram of one embodiment of a wireless communication environment that includes a wireless peripheral device 100 (e.g., such as a wireless QWERTY or other type keyboard (KBD), wireless mouse, wireless game controller, wireless pen, wireless totem, wireless touchpad, wireless smart phone, etc.) positioned within wireless communication range of an information handling system 200 (e.g., such as a notebook or desktop computer, convertible or tablet computer, all-in-one computer, etc.). In the embodiment of FIG. 1, wireless peripheral device 100 includes a host processing device or host programmable integrated circuit 105 (e.g., dedicated processor or microcontroller) that is programmed to execute one or more applications, e.g., such as to accept and interpret content of input signals provided by a human user via an input/output interface 103 (e.g., QWERTY keyboard keys, touchpad, game controller buttons, smart phone touchscreen, etc.) to produce corresponding user input data. Applications executing on host processing device may also or alternatively be programmed to produce other types of end device data, such as sensed data obtained from optional sensors (temperature, pressure, humidity, proximity, etc.) of peripheral device 105. Non-volatile memory (NVM) 111 may also be present on device 100 for storing code, identification information, etc. that is accessible for reading and writing by wireless controller 181 and host processing device 105.

Host processing device 105 of peripheral device 100 is in turn coupled to provide the user input data and/or the other types of end device data to wireless controller 181 which may be, for example, a microcontroller executing logic components of Bluetooth wireless protocol (e.g., SIG Bluetooth 4.x or Bluetooth 5 "BLE" protocol) or other suitable wireless protocol such as IEEE 802.11x WiFi protocol, IEEE 802.15.4 Zigbee protocol, IEEE 802.11 (Wi-Fi), near field communication (NFC) protocol such as ISO/IEC 14443 and FeliCa, ISO/IEC 18092, GSMA NFC Standards, etc. In one embodiment, host processing device 105 may also be programmed to execute code and/or application programming interfaces (APIs), and to provide communication data to wireless controller 181 (e.g., data that includes information for advertisement, services, encryption, authentication, pairing, connection, bonding, etc.) that facilitates wireless communication between wireless peripheral device 100 and components of information handling system 200 and any other available wireless devices within the wireless communication environment.

Wireless controller 181 may be in turn configured to manage transmission from wireless peripheral device 100 of the data provided from host processing device 105 by providing this data as outgoing wireless protocol data in a controlled manner for transmission via antenna element/s 182 by radio hardware module (radio) 180, which may include one or more radio circuit components such as baseband processor, transmitter, receiver, transceiver, etc. Wireless controller 181 may also manage incoming wireless protocol data received via antenna element/s 182 and radio hardware module 180 from information handling system 200 and/or other wireless devices within the wireless communication environment. Wireless controller 181 in turn passes this received data to host processing device 105 for further processing. In this way, wireless controller 181 may exchange wireless protocol data (e.g., negotiation and connection requests, authentication information, user input data, other end device data, etc.) with information handling system 200 and any other available wireless devices within the wireless communication environment.

Still referring to FIG. 1, information handling system 200 includes a host processing device 205 (e.g., such as an Intel Pentium series processor, an Advanced Micro Devices (AMD) processor or one of many other processors currently available) that are coupled together in this embodiment with a platform controller hub (PCH) 206. Host processing device 205 may be configured to execute an operating system (OS) such as Windows-based operating system, Linux-based operating system, etc. Volatile system memory 215 (e.g., DRAM) and a display controller 220 may be coupled as shown to host processing device 205, with a display device 225 (e.g., video monitor) coupled to display controller 220 to provide visual images (e.g., via graphical user interface) to a human user, e.g., via eDP components 219 such as eDP cable and eDP connector. Media drives 235 (e.g., hard disk drive, optical drive, solid state drive, etc.) may be coupled as shown to host processing device 205 via PCH 206 to provide permanent storage for the information handling system. Also illustrated are optional local input device/s 245 such as a keyboard and/or a mouse/touchpad that may be coupled via hardwire and PCH 206 to host processing device 205 to enable the user to interact via hardwire (e.g., such as USB bus) with the information handling system. Not shown in FIG. 1 is an optional expansion bus (e.g., such as PCI bus, PCI Express bus, SATA bus, USB, etc.) that may also be coupled to PCH 206 to provide the information handling system with additional plug-in functionality.

An embedded controller (EC) 270 may also be coupled to PCH 206 as shown, and may be programmed to perform various tasks such as power management, I/O control, etc. As will be described further herein, EC 270 may also be optionally programmed to perform one or more wireless communication tasks (e.g., negotiation, authentication, etc.) for facilitating communication between wireless peripheral device 100 and information handling system 200. Non-volatile memory (NVM) storage 211 (e.g., embedded and partitioned flash memory, Electrically Erasable Programmable Read Only Memory—EEPROM, etc.) may be coupled to EC 270 for storing persistent information for EC 270 and other system information, e.g., including Advanced Configuration and Power Interface (ACPI) information, as well as other information such as system basic input/output system (BIOS) firmware, etc. Additionally, NVM 211 may optionally also store wireless authentication and negotiation information that may be optionally accessed and utilized by EC 270 for performing wireless communication tasks described further herein. It will be understood that other embodiments, non-volatile memory or other non-volatile storage device/s (e.g., such as hard disk drive and/or optical drive, etc.) may also or alternatively be provided elsewhere in system 200 for storing such information, e.g., such as media drives 235.

Still referring to FIG. 1, a wireless radio module (radio) 280 may be coupled to host processing device 205 via wireless controller 283 and PCH 206, and one or more antenna element/s 282 may in turn be coupled to radio module 280 as shown. Further information on configuration, operation, and use of wireless radio modules with information handling systems may be found, for example, in U.S. Pat. No. 9,853,748, which is incorporated herein by reference in its entirety for all purposes. In similar manner as described for wireless peripheral device 100, wireless controller 283 which may be, for example, a microcontroller executing logic components of Bluetooth wireless protocol (e.g., BLE specifications defined in Bluetooth 4.x (including Bluetooth 4.0, 4.1, 4.2, etc. core version specifications) and/or Bluetooth 5 core version specification that are available together with addendums and supplements thereto from the Bluetooth Special Interest Group "SIG".

It will be understood that other wireless communication protocols may be employed in place of BLE wireless protocol for wireless communication between wireless peripheral device 100 and information handling system 200 in the embodiments herein. Examples of such other wireless communication protocols include, but are not limited to, non-BLE wireless communication protocols such as IEEE 802.11x WiFi protocol, IEEE 802.15.4 Zigbee protocol, near field communication (NFC) protocol such as ISO/IEC 14443 and FeliCa, ISO/IEC 18092, GSMA NFC Standards, etc. In one embodiment, host processing device 205 may also be programmed to execute code and/or application programming interfaces (APIs), and to provide communication data to wireless controller 283 (e.g., data that includes information for advertisement, services, encryption, authentication, pairing, connection, bonding, etc.) that facilitates wireless communication between components of information handling system 200 and wireless peripheral device 100 and/or any other available wireless devices within the wireless communication environment.

Wireless controller 283 may be configured to manage transmission from information handling system of data provided from host processing device 205 and/or EC 270 by providing this data as outgoing wireless protocol data in a controlled manner for transmission via antenna element/s 282 by radio hardware module 280, which may include one or more radio circuit components such as baseband processor, transmitter, receiver, transceiver, etc. Wireless controller 283 may also manage incoming wireless protocol data received via antenna element/s 282 by radio hardware module 280 from wireless peripheral device 100 and/or other wireless devices within the wireless communication environment, and to provide information from this received incoming data to wireless controller 283. Wireless controller 283 in turn passes this data to host processing device 205 for further processing. In this way, wireless controller 283 may exchange wireless protocol data (e.g., negotiation and connection requests, authentication information, user input data, other end device data, etc.) with wireless peripheral device 100 and any other available wireless devices within the wireless communication environment. It will be understood that the particular configuration of information handling system 200 illustrated in FIG. 1 is exemplary only, and that any other alternative configuration of components suitable for performing wireless communication tasks between a an information handling system and wireless peripheral device is also possible.

In the embodiment of FIG. 1, information handling system 200 is coupled to an external source of power (e.g., AC mains and an optional AC adapter in the case of a battery-powered portable information handling system such as a notebook computer, tablet computer, etc.). As shown, a power circuit 260 may be provided within information handling system 200 to receive external AC or DC power from external power source 250 and provide a regulated source of DC power to power-consuming components of information handling system 200. Power circuit 260 may also optionally include a smart battery pack in those embodiments where system 200 is a battery-powered portable information handling system. A data bus (SMBus) 281 may be coupled to power circuit 260 to provide power state information from power circuit 260 to EC 270 and to other components such as processor 205. Also shown is optional proximity-sensing circuitry 289 (e.g., such thermal sensor circuitry, acoustic sensor circuitry, near field communication (NFC) circuitry or Hall sensor circuity) coupled to PCH 206 that may be provided to sense proximity of wireless peripheral device 100 and/or human user to information handling system 200, e.g., for use in those proximity-sensing embodiments described further herein.

It will be understood that the particular configuration of information handling system and wireless peripheral device illustrated in FIG. 1 is exemplary only, and that any other alternative configuration of components suitable for performing wireless communication tasks between a wireless peripheral device and an information handling system is also possible.

Figure 2:
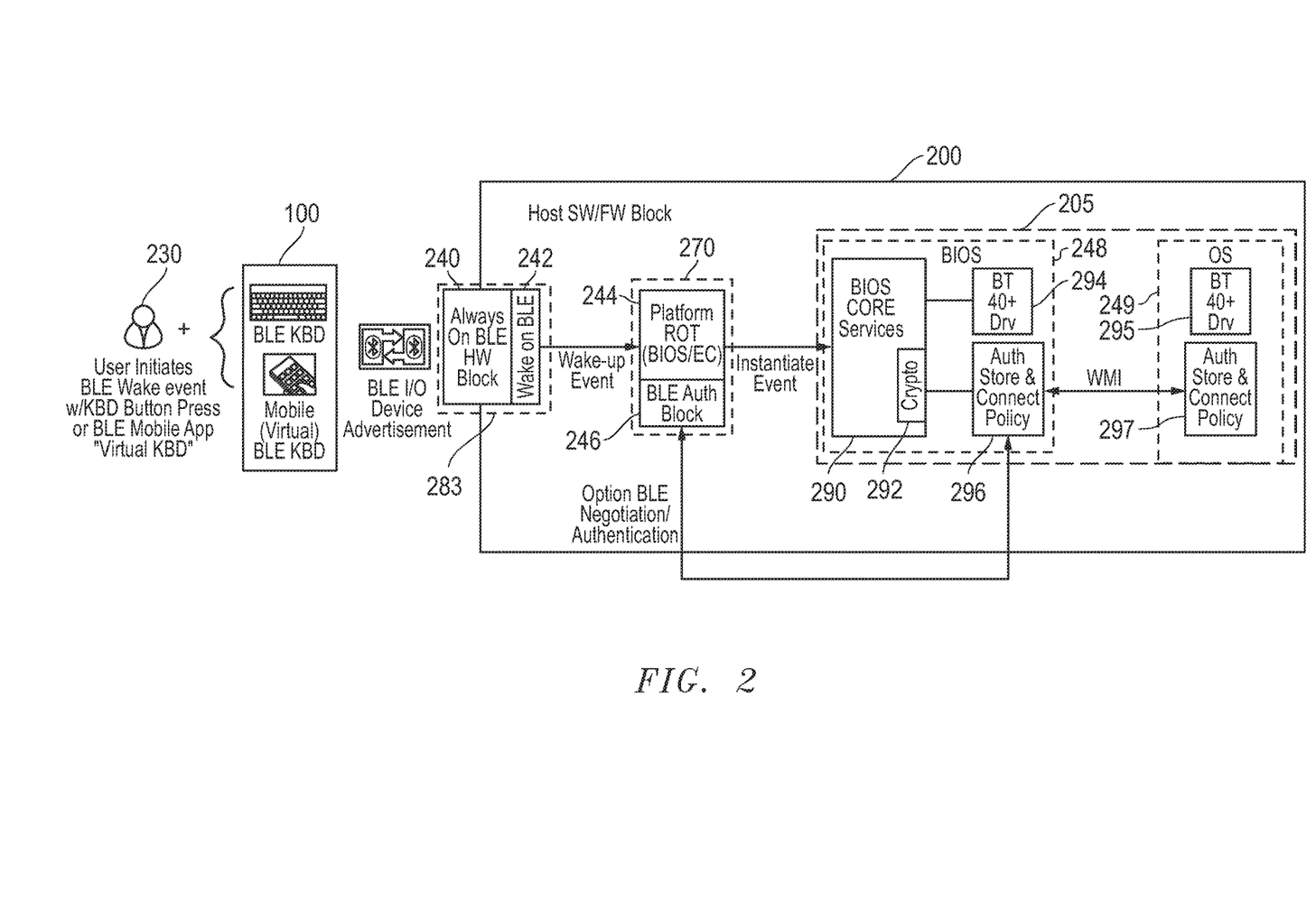
FIG. 2 illustrates wireless communication architecture flow according to one exemplary embodiment of the disclosed systems and methods.

FIG. 2 illustrates one exemplary embodiment of the wireless communication architecture flow as it may be implemented for waking an information handling system 200 from a wireless peripheral device 100 using Bluetooth Low Energy (BLE) wireless communication protocol, although a similar architecture may be implemented for other types of wireless communication protocols such as those other example wireless protocols described herein (e.g., such as WiFi, Zigbee, NFC, etc. It will be understood that use of relatively shorter range wireless communication protocols (e.g., such as NFC) provides additional trust capabilities by requiring the wireless peripheral device 100 to be within a maximum distance that is relatively physically closer to system 200 (e.g., such as two centimeters or less) for it to wake system 200, whereas use of relatively longer range wireless communication protocols (e.g., such as WiFi or BLE) allows for a wider variety of usage cases by allowing the wireless peripheral device 100 to be within a maximum distance that is relatively physically farther away (e.g., such as up to 100 feet away) from system 200 to wake system 200.

In FIG. 2, a human user 230 may initiate a wake-up event for information handling system 200 by making an input to BLE-enabled wireless peripheral device 100 that is connected via BLE wireless communication to information handling system 200, although similar methodology may be implemented for other wireless protocols and/or other types of wireless peripheral devices. In one embodiment, wireless peripheral device 100 may be, for example, a standalone physical wireless keyboard device (having an I/O interface 103 that includes mechanical keyboard keys) or a mobile device (such as smart phone) that displays virtual keyboard (KBD) keys on a touchscreen that serves as an I/O interface 103.

In the illustrated embodiment, wireless peripheral device 100 and information handling system 200 start in a non-connected condition where wireless peripheral device 100 is not wirelessly connected with information handling system 200, and with information handling system 200 operating in a relatively low power-consuming rate state such as one of ACPI Standby (S3 or Modern Standby) state, ACPI Hibernation (S4) state, or ACPI Soft Off (S5) state. At this initial time, wireless peripheral device 100 is not transmitting BLE protocol advertisement packets, and may be in a low power (e.g., standby state) although this state is not necessary. While in this initial non-connected condition, user 230 may enter a keystroke (or enter a defined keystroke sequence) on the I/O interface 103 of wireless peripheral device 100 which is received as a user input signal by host processing device 105 of device 100. Host processing 105 may then respond to the user input signal from user 230 by providing corresponding user input data and otherwise interacting with wireless controller 181 to cause radio module 180 of wireless peripheral device 100 to begin transmitting BLE advertising packets on BLE advertising channels via antenna 182, e.g., as a BLE advertiser (or slave) device. As further described below, the BLE advertising packets transmitted from wireless peripheral device 100 are received as an input/output (I/O) wake request via antenna 282 and radio module 280 of information handling system 200, and indicate to information handling system 200 that the wireless peripheral device 100 is currently within BLE wireless communication range proximity of information handling system 200.

As illustrated in the exemplary embodiment of FIG. 2, wireless controller 283 of system 200 is a BLE controller that includes a silicon hardware (HW) block 240 that is always on, even while the remainder of information handling system (e.g., CPU 205 and/or EC 270) is operating in a relatively low power-consuming rate state. Radio module 280 (shown in FIG. 1) also remains always-on to receive incoming wireless signals including wireless protocol data (e.g., such as BLE protocol advertising packets received on BLE advertising channels from wireless peripheral device 100), and to provide wireless protocol data from these received signals to wireless controller 283 which performs wireless discovery tasks, e.g., acting as a BLE scanner/initiator (or master) device. In this embodiment of FIG. 2, always-on wireless HW block 240 of wireless controller 283 (acting as an always-on wireless HW block in this embodiment) includes a HW state machine that executes to recognize and interpret received BLE protocol advertisement packets from wireless peripheral device 100 as an I/O wake request from device 100 that is destined for the platform of system 200. Upon recognition that an I/O request has been so received from wireless peripheral device 100, wake on wireless logic block 242 of wireless controller 283 (acting as a wake-on BLE logic block in this embodiment)) generates a wake event (e.g., as a general-purpose input/output "GPIO" interrupt) that is provided to EC 270 as shown. This wake event from wireless controller 283 may also serve to wake up EC 270 in those embodiments where EC 270 is operating in a reduced power state at this time.

In the embodiment of FIG. 2, the wake event provided from wireless controller 283 to EC 270 prompts components (e.g., EC 270 and CPU 205) of information handling system 200 to perform steps to load the essential firmware (FW) stack to enable processing of BLE human interface device (HID) input data over the BLE generic attribute profile (GATT) device profile that defines GATT commands and requests (as well as notifications and indications) for communication between wireless peripheral device 100 and information handling system 200. In the illustrated embodiment of FIG. 2, EC 270 may be programmed to execute BLE authentication logic 246 and Platform Root of Trust (RoT) 244 for computing while CPU 205 remains in low power state (such as ACPI Standby (S3 or Modern Standby) state, ACPI Hibernation (S4) state, ACPI Soft Off (S5) state, etc.). However, in other embodiments, all or portion of logic components 244 and 246 may be alternatively executed by CPU 205. Returning to this embodiment, platform ROT 244 and BLE authentication logic 246 executing on EC 270 may include only those core components of the BLE FW stack that are needed for validating authenticity of the wake request received from wireless peripheral device 100. In this way, the remaining components of the full FW stack (e.g., including BIOS core service 290 and crypto 292) may be executed by BIOS 248 on CPU 205, and thus CPU 205 may remain at minimal power until the initial authenticity of the wake request is first validated by EC 270 using Platform ROT 244 and BLE Authentication logic 246.

Upon validation by Platform ROT 244 and BLE Authentication logic 246 of EC 270, Platform ROT 244 on EC 270 instantiates the event and fully wakes BIOS 248 (with BIOS core services 290) on CPU 205 to also load the full BIOS DXE BLE protocol stack 294 with drivers (e.g., BLE 4.0+ protocol) which includes HID over GATT profile (HOGP) support for interaction with wireless (e.g., BLE) controller 283). BIOS DXE BLE protocol stack 294 also allows and facilitates interaction with wireless controller 283. At this time, BIOS 248 may be optionally enabled to drive more granular device/user authentication using authentication store (Authstore) and connect policy 296 (e.g., if Authentication is enabled/initialized). Austhstore and connect policy 296 may contain security information such as keys and security policy such as defining which devices and circumstances (e.g., user 230, IT or system administrator, etc.) can wake information handling system 200. Authstore and connect policy 296 may be maintained on local NVM 211 (Flash), and may be provisioned by direct pairing with a given wireless peripheral device 100 that provides keys and device 100 identity information to system 200 to allow the wireless peripheral device 100 to later wake the system 200.

In another embodiment, Authstore and connect policy 296 may be securely retrieved from a server (i.e., that is different from a given wireless peripheral device 100) in advance across a network (e.g., Internet or corporate intranet) using remote management capability, e.g., security keys and device 100 identity may be first provisioned from a remote administrative server to allow a given wireless peripheral device 100 having the same keys and device identity information to later wake the system 200. For purposes of synchronizing wireless device information of a wireless peripheral device 100, BIOS 248 may interface with operating system (OS) 249 to allow sharing of Authstore and connect policy 246 information of BIOS 248 with Authstore and connect policy 247 of OS 249 via Windows Management Instrumentation (WMI). Similarly, DXE BLE protocol stack information may be shared between BIOS DXE BLE protocol stack 294 and DXE BLE protocol stack 295 of OS 249 via Windows Management Instrumentation (WMI).

Figure 3:
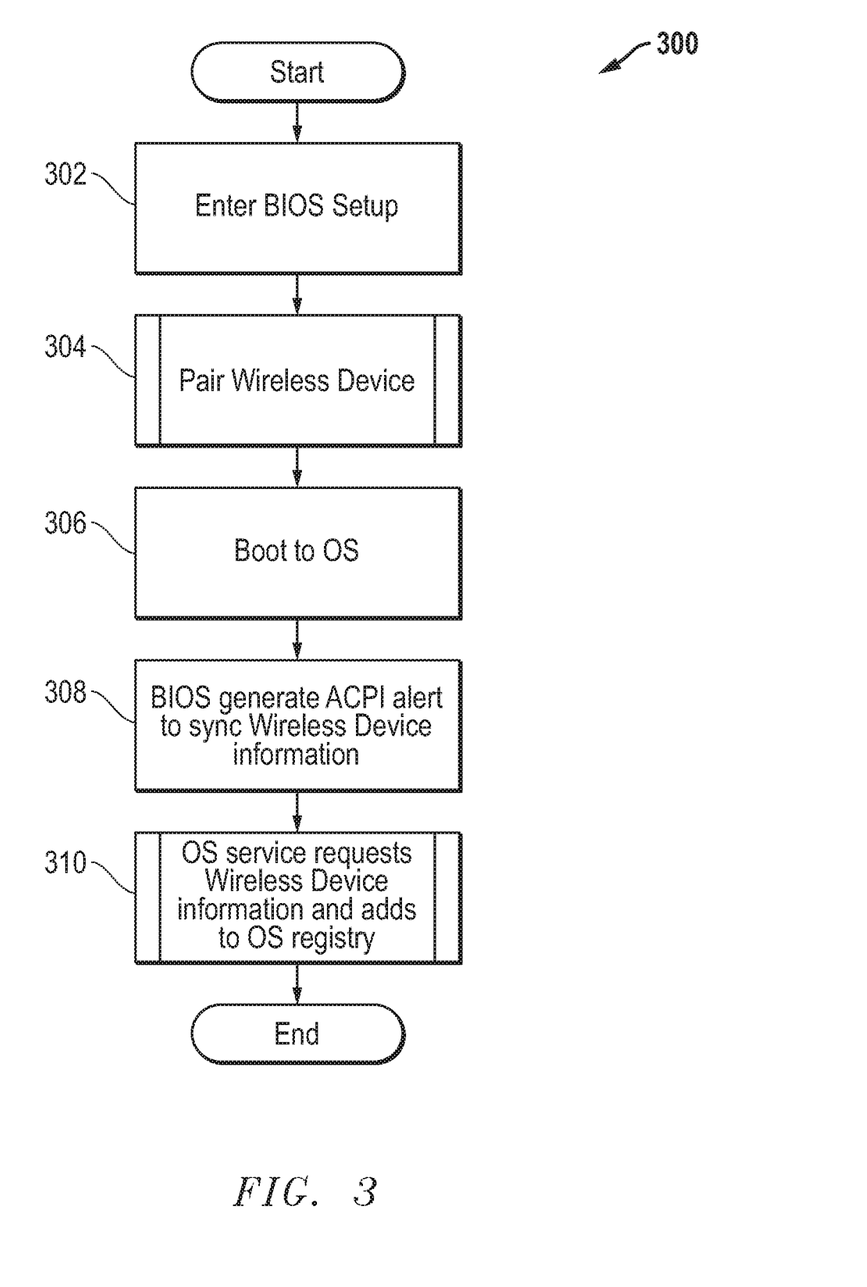
FIG. 3 illustrates methodology according to one exemplary embodiment of the disclosed systems and methods.
Figure 4:
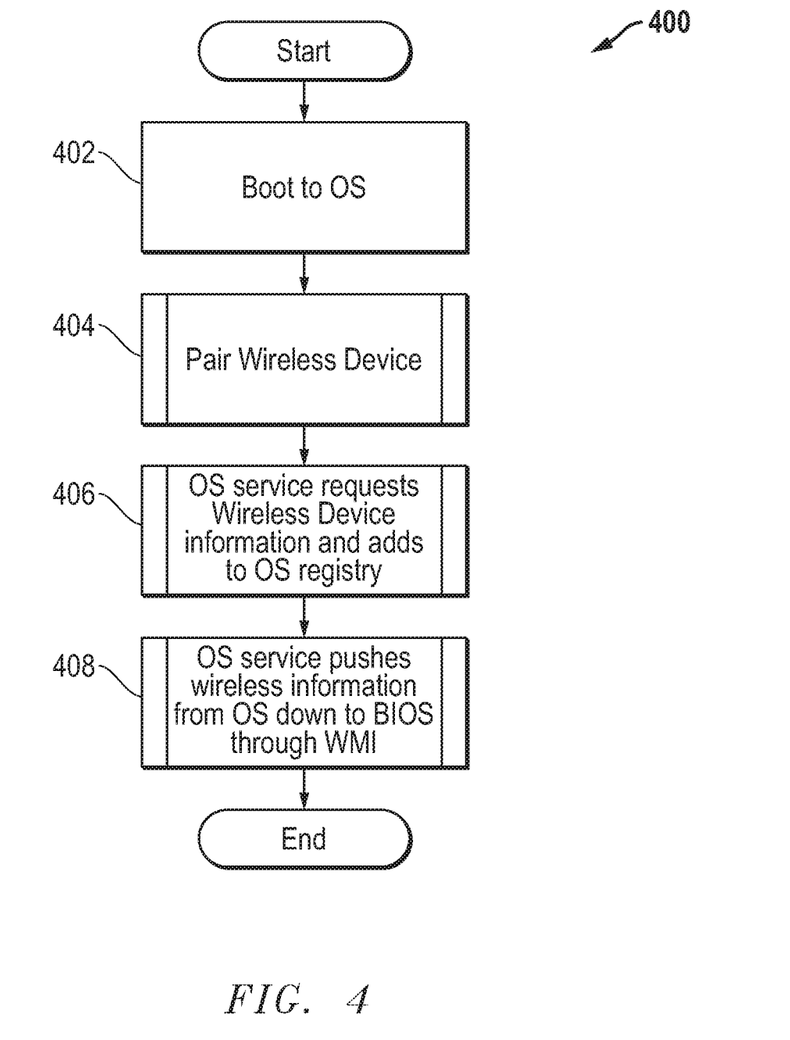
FIG. 4 illustrates methodology according to one exemplary embodiment of the disclosed systems and methods.

FIGS. 3 and 4 illustrate exemplary embodiments of methodologies that may be implemented on information system 200 to allow a user 230 to request and accomplish synchronization of wireless device information (e.g., wireless pairing information such as one or more of Device ID, Connection Collateral (MAC/Address), keys, etc.) for the wireless peripheral device 100 between the OS 249 and BIOS 248 of information handling system 200. This information synchronization methodology may be initially performed so that re-provisioning of this wireless information is not later required every time that the wireless peripheral device 100 attempts to wake the information handling system 200 (e.g., using a methodology such as illustrated and described in relation to FIGS. 2 and 5).

In the embodiment FIG. 3, wireless device synchronization occurs at the BIOS operating level by first pairing wireless peripheral device 100 with information handling system 200 while OS 249 is not booted (i.e., in a pre-boot environment). As shown, a user 230 may initiate methodology 300 of FIG. 3 during BIOS power-on self-test (POST) of information handling system 200 by entering BIOS setup in step 302, e.g., by entering a designated keystroke or other input type on local input device/s 245 during system POST to bring up a user interface menu on display 225 that allows the user to enter a selection to request the system 200 be wirelessly paired (e.g., BLE pairing) with the wireless peripheral device 100. Then in step 304, the information handling system 200 pairs with the wireless peripheral device 100 by exchanging wireless pairing information specific to the current wireless transport protocol with the wireless peripheral device. Examples of such wireless pairing information includes, but is not limited to, one or more of Device ID, Connection Collateral (MAC/Address), keys, etc.

Still referring to FIG. 3, once device 100 is wirelessly paired with system 200 in step 304 and BIOS 248 completes system POST, system 200 then boots to OS 249 in step 306. After OS 249 is booted and executing, then in step 308 BIOS 248 generates and provides an alert (e.g., ACPI alert message) to OS 249 to initiate steps to complete wireless device synchronization by synchronizing paired device information between OS 249 and BIOS 248 of the information handling system 200. In step 310, an OS service of OS 249 may be provided to respond to receipt of this BIOS alert by requesting wireless device information (e.g., wireless pairing information such as one or more of Device ID, Connection Collateral (MAC/Address), keys, etc.) from BIOS 248. When received from wireless peripheral device 100, the OS service adds this wireless device information in step 310 to the OS registry (e.g., that is stored on and loaded from media drive/s 235 and/or memory 215).

In the embodiment FIG. 4, wireless device synchronization occurs at the OS operating level by pairing wireless peripheral device 100 with information handling system 200 after OS 249 is booted (i.e., in a post-boot environment). As shown in FIG. 4, OS 249 is first booted in step 402, e.g., at power-on or reboot of system 200 by user 230. After OS 249 is booted and running, user 230 may initiate pairing of wireless peripheral device 100 with information handling system 200, e.g., by entering an appropriate selection (e.g., keystroke or mouse selection) via local input device/s 245 to request wireless paring into a wireless pairing graphical user interface menu (GUI) that is provided on display 225 by a software enrollment agent implemented separately on each of BIOS 248 and OS 249. Then in step 404, information handling system 200 pairs with the wireless peripheral device 100 by exchanging pairing information (e.g., wireless pairing information such as one or more of Device ID, Connection Collateral (MAC/Address), keys, etc.).

Still referring to FIG. 4, an OS service of OS 249 may be provided that requests wireless device information (e.g., wireless pairing information such as one or more of DeviceID, Connection Collateral (MAC/Address), keys etc.) in step 406 from BIOS 248. When received from wireless peripheral device 100, the OS service adds this wireless device information in step 406 to the OS registry (e.g., that is stored on and loaded from media drive/s 235 and/or memory 215).

In step 310, an OS service of OS 249 responds to receipt of this BIOS alert by requesting wireless device information (e.g., wireless pairing information such as one or more of Device ID, Connection Collateral (MAC/Address), keys, etc.) from BIOS 248. When received from wireless peripheral device 100, the OS service adds this wireless device information in step 310 to the OS registry (e.g., that is stored on and loaded from media drive/s 235 and/or memory 215).

It will be understood that methodologies of FIGS. 3 and 4 are exemplary only, and that any combination of fewer, additional and/or alternative steps may be employed that are suitable for accomplishing synchronization of wireless device information for a wireless peripheral device 100 between the OS 249 and BIOS 248 of information handling system 200 such that re-provisioning of this wireless information is not later required every time that the wireless peripheral device 100 attempts to wake the information handling system 200.

Figure 5:
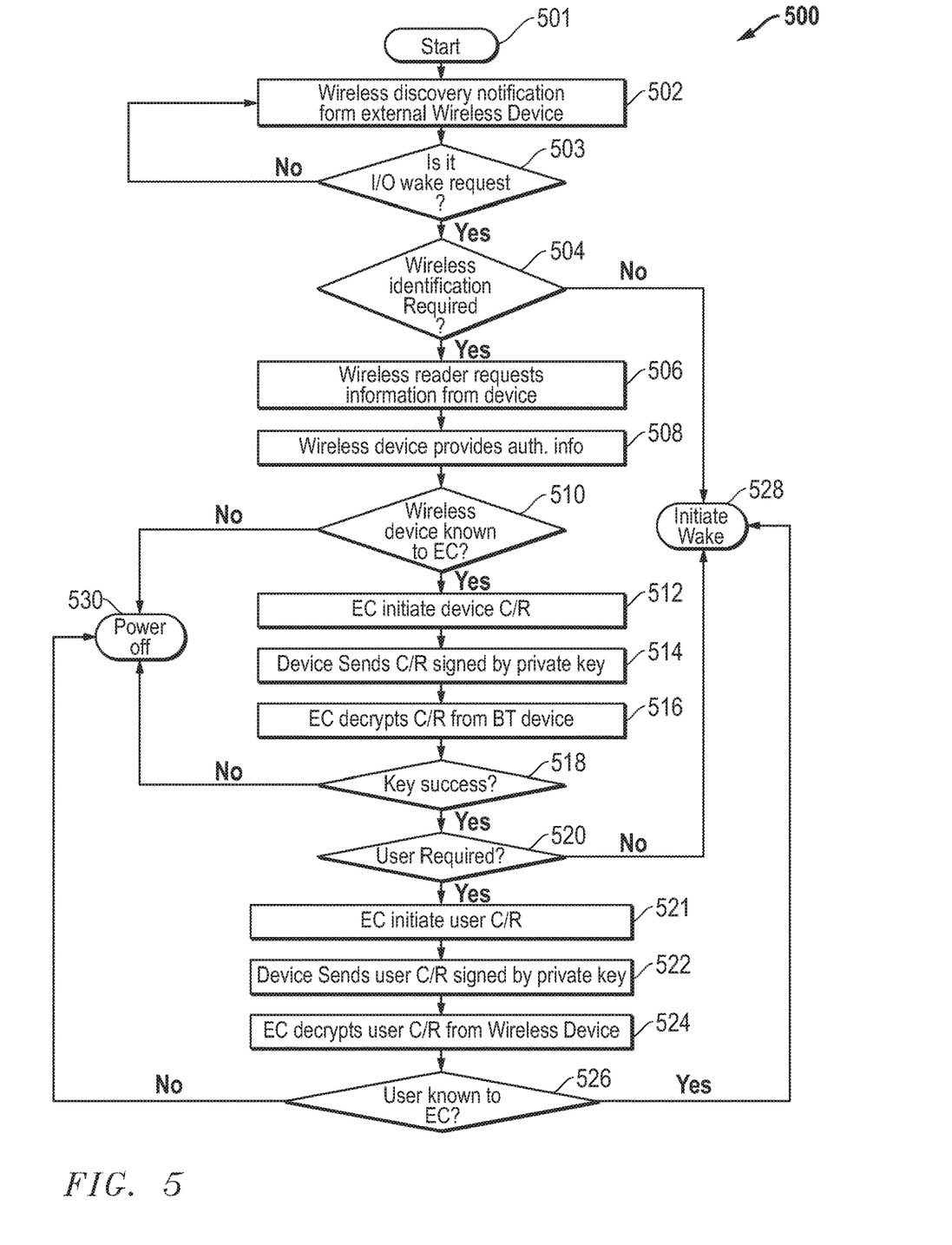
FIG. 5 illustrates methodology according to one exemplary embodiment of the disclosed systems and methods.

FIG. 5 illustrates one embodiment of methodology 500 that may be employed for waking one or more components of information handling system 200 from a reduced-powered state in response to a wireless signal wake-up event received from a wireless peripheral device 100, such as a wireless keyboard, wireless mouse, wireless game controller, wireless pen, wireless totem, wireless smart phone, etc. In one embodiment, methodology 500 may be implemented to securely enable non-operating system (OS) components and non-BIOS components of an information handling system 200 to perform pre-OS operations to determine whether or not to wake other components (e.g., such as a system OS 249 and/or system BIOS 248 executing on host processing device 205 and/or embedded controller 270) of the information handling system 200 from a reduced-powered state upon receipt of the wireless signal wake-up event. Examples of such non-OS and non-BIOS components include, but are not limited to, always-on wireless HW block 240 and wake-on wireless block 242 of wireless controller 283 of the embodiment of FIG. 2. In the embodiment of FIG. 5, each of three layers of increasing security hierarchy are enabled and delineated from each other by decision steps 504 and 520 of FIG. 5, and end in each case with step 528 or 530. It will be understood that the methodology of any one of these three security layers may be implemented alone on a given information handling system 200, i.e., by skipping decision steps 504 and/or 520.

As shown, methodology 500 begins in step 501, with EC 270 and host processing device 205 of system 200 in a reduced-power state (e.g., ACPI state S3, S4, S5, etc.), i.e., with neither BIOS 248 or OS 249 being executed or otherwise operating. Rather, at step 501, only the radio module 280 and always-on wireless HW block 240 and wake-on wireless block 242 of wireless controller 283 are executing and operating to receive a wireless notification request in the form of a wireless advertising packet (e.g., such as BLE protocol advertising packet) as an I/O wake request from wireless peripheral device 100 in step 502. Upon receipt of wireless advertising packet in step 502, wireless HW block 240 of wireless controller 283 executes to determine in step 503 if the current received wireless protocol advertisement packets qualify as an actual I/O wake request received from a wireless peripheral device 100 (e.g., rather than a random advertisement packet received from another wireless device). This determination in step 503 may be made, for example, based on whether or not the received packet is a designated known wakeup packet type (e.g., having pre-designated packet characteristics such as a specific length and/or data format) that corresponds to an approved I/O wake request. If the current received wireless protocol advertisement packet/s is not such an attempted I/O wake request (e.g., received packet is not a designated known wakeup packet type), then methodology 500 returns from step 503 to step 501 and repeats. However, upon recognition in step 503 that a bonafide I/O wake request has been so received (e.g., received packet is indeed a designated known wakeup packet type) from wireless peripheral device 100, methodology 500 wakes EC 270 and proceeds to step 504.

In step 504 of FIG. 5, it is determined whether a second layer of security (i.e., wireless device identification) is required from the wireless peripheral device 100 that sent the current wireless advertisement packet. This determination may be made based on whether additional authentication steps have been specified in the logic code of platform ROT 244 that require additional wireless identification information from the wireless peripheral device to allow a wake event to proceed on system 200. If no such additional information and authentication steps are required (i.e., receipt of any wireless packet is sufficient to allow wake of system 200), then methodology 500 proceeds to step 528 where wake on wireless logic 242 of wireless controller 283 initiates a wake event in step 528 (e.g., as a general-purpose input/output "GPIO" interrupt that is provided to EC 270 as shown in FIG. 2).

At step 528, EC 270 proceeds to instantiate the wake event and fully wake BIOS 248 (with BIOS core services 290) on CPU 205 to also load the full BIOS DXE BLE protocol stack 294 with drivers (e.g., BLE 4.0+ protocol) which includes HID over GATT profile (HOGP) support for interaction with wireless (e.g., BLE) controller 283). Thus, in step 528, the wake event provided from wireless controller 283 to EC 270 causes EC 270 to wake host processing device 205 of information handling system 200, and to together perform steps described in relation to FIG. 2 to load the essential firmware (FW) stack to enable processing of BLE human interface device (HID) input data over the BLE generic attribute profile (GATT) device profile that defines GATT commands and requests (as well as notifications and indications) for communication between peripheral wireless peripheral device 100 and information handling system 200.

However, in the case that it is determined in step 504 that additional wireless identification information from the wireless peripheral device 100 is required together with additional authentication steps to allow a wake event to proceed on system 200, then methodology 500 proceeds to step 506 where wireless reader of always-on wireless HW block 240 causes wireless controller 283 to send a wireless message requesting the required additional identification information via wireless communication from radio module 280 to radio module 180 and wireless controller 181/Host 105 of wireless peripheral device 100. Examples of such wireless authentication information includes, but is not limited to, public key for device 100, MAC address, etc.

Next, in step 508, wireless controller 181 of wireless peripheral device 100 responds to the received request of step 506 by providing the requested wireless identification via radio module 180 via wireless communication to radio module 280 and wireless controller 283 of system 200. Wireless controller 283 then provides the provided additional wireless identification information to EC 270 which determines in step 510 if the wireless peripheral device 100 is known to the EC 270. EC 270 may make this determination by comparing the provided wireless identification information to see if it matches with device identification information of previously-synchronized wireless pairing information, e.g., stored on NVM 211 or other system non-volatile memory during previous pairing that occurred using the methodology of FIG. 3 or 4. If the current wireless peripheral device 100 is found not to be known to the EC 270 in step 510 (i.e., the current wireless peripheral device 100 has not been previously paired with system 200), then methodology 500 terminates in step 530 by returning to the previous reduced-power state of step 501.

However, in the case that it is determined in step 510 that the current given wireless peripheral device 100 is known to the EC 270 in step 510 (i.e., the current wireless peripheral device 100 has been previously paired and exchanged keys and identity information with system 200 during methodology of FIG. 3 or FIG. 4), then methodology 500 proceeds to step 512 where EC 270 implements asymmetric authentication with device 100. It will be understood that any suitable asymmetric authentication methodology may be employed, but in one embodiment EC initiates a challenge/response (C/R) protocol by creating a nonce and sending a C/R message (i.e., including the nonce encrypted with the system 200 public key) to the given wireless peripheral device 100 via wireless controller 283 and radio module 280. Upon receipt of the C/R message, host 105 and/or wireless controller 181 of the given device 100 signs the received C/R message with its (device 100) private key and system (EC 270) public key, and sends this signed C/R message back to system 200 in step 514.

In step 516, EC 270 then decrypts the signed C/R message received from the given device 100 with the device 100 public key to verify that the signed C/R message was received from the given device 100, and then decrypts the C/R message itself with the system (EC 270) 200 private key and reads the value of the decrypted C/R message to verify that it is the same as the original C/R message sent by system 200 in step 512. If it is determined in step 518 that both decryption tasks of step 516 were successful to decrypt and read the original system 200 C/R message, then methodology 500 proceeds to step 520 described further below. However, if it is determined in step 518 either or both of the decryption tasks of step 516 were not so successful, then methodology 500 terminates in step 530 by returning to the previous reduced-power state of step 501.

In step 520, EC 270 determines if a third layer of security (i.e., user identification) is required from the user 230 of the wireless peripheral device 100 that sent the current wireless advertisement packet. This determination may be made based on whether additional authentication steps have been specified in the logic code of wireless HW block 240 that require additional user identification information from the user to allow a wake event to proceed on system 200. If no such additional user information and authentication steps are required, then methodology 500 proceeds to step 528 where EC instantiates the wake event to fully wake BIOS and OS on CPU 205 of system 200 as previously described. However, in the case that it is determined in step 520 that additional user identification information from the user 230 of wireless peripheral device 100 is required together with additional user authentication steps to allow a wake event to proceed on system 200, then methodology 500 proceeds to step 521 where EC 270 implements user authentication with user 230.

It will be understood that any suitable user authentication methodology may be employed, including any suitable C/R response methodology. In the illustrated embodiment of FIG. 5, EC 270 implements authentication with user 230 in step 521 by creating and sending a user C/R request message requesting user identification information (e.g., such as user ID, user password, etc.) to the given wireless peripheral device 100 via wireless controller 283 and radio module 280. Upon receipt of the user C/R request message, host 105 and/or wireless controller 181 of the given device 100 reads the user C/R request message, and displays or otherwise communicates a corresponding request for user identification information to the user 230 (e.g., via display of request on display device 225). User 230 responds by entering their appropriate user ID, user password and/or any other requested user identification information, e.g., using local input device/s 245. Host 105 and/or wireless controller 181 of the given device 100 then creates a user C/R reply message, signs it with its (device 100) private key and system (EC 270) public key, and sends this signed C/R message back to system 200 in step 522. In step 524, EC 270 of system 200 then decrypts the signed user C/R reply message received from the given device 100 with the device 100 public key to verify that the signed C/R message was received from the given device 100, and then decrypts the user C/R reply message itself with the EC 270 private key and reads the user identification information contained therein.

Next, in step 526, EC 270 compares the user identification information from the user C/R replay message to corresponding user identification of known user/s that has been previously stored on NVM 211 or other non-volatile memory of system 200. If the user identification information from the user C/R replay message matches the stored user identification on system 200, then the current user 230 is known to EC 270 and methodology 500 proceeds to step 528 where EC instantiates the wake event to fully wake BIOS and OS on CPU 205 of system 200 as previously described. However, if it is determined in step 526 that user identification information from the user C/R replay message does not match any stored user identification on system 200, then methodology 500 terminates in step 530 by returning to the previous reduced-power state of step 501.

It will be understood that methodology of FIG. 5 is exemplary only, and that any combination of fewer, additional and/or alternative steps may be employed that are suitable for waking an information handling system from a reduced-powered state in response to a wireless signal wake-up event received from a wireless peripheral device, while implementing one or more optional layers of security such as wireless peripheral device identity verification and/or user identity verification.

It will also be understood that one or more of the tasks, functions, or methodologies described herein (e.g., including those described herein for components 105, 180, 181, 205, 270, 280, 283, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions is configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus, the invention is not limited to only those combinations shown herein, but rather may include other combinations.

What is claimed is:

1. A method, comprising:
   receiving a wireless advertising packet in an information handling system, the wireless advertising packet being a wireless input/output (I/O) wake request from a wireless peripheral device that is received at the same time that a host programmable integrated circuit that executes a basic input/output system (BIOS) and an operating system (OS) of the information handling system is turned off and unpowered with the BIOS and OS not awake and not executing on the information handling system; and
   then turning on and powering the host programmable integrated circuit and waking and executing the BIOS and OS of the information handling system in response to receipt of the wireless I/O wake request from the wireless peripheral device;
   where the host programmable integrated circuit comprises a central processing unit (CPU) of the information handling system;
   where the method further comprises receiving the wireless advertising packet as the wireless I/O wake request in a radio that is coupled to a separate microcontroller of the information handling system, the separate microcontroller being coupled between the radio and host programmable integrated circuit and being programmed to remain active and awake to receive the wireless I/O wake request via the radio while the CPU of the information handling system is turned off and unpowered; and where the waking comprises turning on and powering the CPU of the information handling system to execute the BIOS and OS; and
   where the method further comprises:
   receiving the wireless advertising packet in the information handling system at the same time that an embedded controller (EC) of the information handling system is turned off and unpowered, the EC being coupled between the CPU and the separate microcontroller, and the separate microcontroller being programmed to remain active and awake to receive the wireless I/O wake request via the radio while both the EC and the CPU of the information handling system are turned off and unpowered,
   then verifying in the separate microcontroller while the EC and CPU remain turned off and unpowered that the received wireless advertising packet is a type of wireless advertising packet having pre-designated packet characteristic/s that qualify the received wireless advertising packet as an approved wireless I/O wake request,
   then using the separate microcontroller to turn on and power the EC while the CPU remains turned off and unpowered only if the separate microcontroller verifies that the received wireless advertising packet has the pre-designated packet characteristic/s that qualify the received wireless advertising packet as an approved wireless I/O wake request, and
   then using the EC to turn on and power the CPU and wake and execute the BIOS and OS of the information handling system.

2. The method of claim 1, further comprising:
   using the separate microcontroller to send a wireless message via the radio to request wireless identification information from the wireless peripheral device after using the separate microcontroller to turn on and power the EC and prior to using the EC to turn on and power the CPU; and then using the EC to turn on and power the CPU only if:
the wireless peripheral device responds to the request for wireless identification information by providing the requested wireless identification information via the radio to the separate microcontroller,
the separate microcontroller provides the requested wireless identification information to the EC; and
the EC determines that the provided wireless identification information from the wireless peripheral device matches previously-stored wireless pairing information retrieved by the EC from non-volatile memory of the information handling system.

3. The method of claim 2, further comprising using the EC to:
implement asymmetric authentication with the wireless peripheral device after using the separate microcontroller to turn on and power the EC and prior to using the EC to turn on and power the CPU by sending an encrypted original challenge/response (C/R) message via the separate microcontroller and radio to the wireless peripheral device;
then receive a signed encrypted C/R message via the radio and separate microcontroller from the wireless peripheral device in response to the encrypted C/R message;
then decrypt the received signed encrypted C/R message and determine if the received signed encrypted C/R message is both actually received from the wireless peripheral device and contains the same original C/R message sent to the wireless peripheral device; and
then turn on and power the CPU only if the received signed encrypted C/R message is determined to be both actually from the wireless peripheral device and contains the same original C/R message sent to the wireless peripheral device.

4. The method of claim 2, further comprising using the EC to:
implement user authentication with the wireless peripheral device after using the separate microcontroller to turn on and power the EC and prior to using the EC to turn on and power the CPU by sending an encrypted challenge/response (C/R) request message requesting users identification information via the separate microcontroller and radio to the wireless peripheral device;
then receive a signed encrypted user C/R message via the radio and separate microcontroller from the wireless peripheral device in response to the encrypted C/R request message;
then decrypt the received signed encrypted C/R request message and determine if the received signed encrypted C/R request message is both actually received from the wireless peripheral device and contains user identification information that matches user identification information of a known user that is retrieved by the EC from the non-volatile memory of the information handling system;
then turn on and power the CPU only if the received signed encrypted C/R message is determined to be both actually received from the wireless peripheral device and contains the same original C/R message sent to the wireless peripheral device.

5. The method of claim 1, where the receiving comprises receiving the wireless advertising packet in the information handling system while the information handling system is in one of an Advanced Configuration and Power Interface (ACPI) reduced power state S3, S4 or S5; and where the waking comprises transitioning the information handling system from the ACPI reduced power state to an ACPI S0 state.

6. The method of claim 1, further comprising transmitting the wireless advertising packet from the wireless peripheral device in response to a user input action to the wireless peripheral device.

7. The method of claim 1, further comprising verifying the identity of the wireless peripheral device and/or user of the wireless peripheral device before turning on and powering the host programmable integrated circuit and waking and executing the BIOS and OS of the information handling system by authenticating the wireless I/O wake request at the information handling system using security keys and identity information previously stored in non-volatile storage on the information handling system; and then only turning on and powering the host programmable integrated circuit and waking and executing the BIOS and OS of the information handling system upon successful authentication of the wireless OS wake request.

8. The method of claim 7, further comprising performing the following before receiving the wireless advertising packet:
executing the BIOS of the information handling system to retrieve wireless pairing information from the wireless peripheral device in a pre-boot environment, the wireless pairing information comprising the security keys and/or identity information;
then booting the OS on the information handling system to store the security keys and/or identity information in a registry of the OS on the non-volatile storage of the information handling system; and
then placing the information handling system in the state with the host programmable integrated circuit turned off and unpowered and with the BIOS and the OS not awake and not executing on the information handling system.

9. The method of claim 7, further comprising performing the following before receiving the wireless advertising packet:
booting and executing the OS of the information handling system to retrieve wireless pairing information from the wireless peripheral device in a post-boot environment, the wireless pairing information comprising the security keys and/or identity information;
then using the OS to store the security keys and/or identity information in a registry of the OS on the non-volatile storage of the information handling system; and
then placing the information handling system in the state with the host programmable integrated circuit turned off and unpowered and with the BIOS and the OS not awake and not executing on the information handling system.

10. The method of claim 7, further comprising performing the following before receiving the wireless advertising packet:
retrieving the security keys and identity information from a server;
then storing the security keys and identity in a registry of the OS on the non-volatile storage of the information handling system; and
then placing the information handling system in the state with the host programmable integrated circuit turned off and unpowered and with the BIOS and the OS not awake and not executing on the information handling system.

11. The method of claim 1, further comprising performing the following before receiving the wireless advertising packet:
  retrieving wireless pairing information from the wireless peripheral device or a server;
  then synchronizing the wireless pairing information between the BIOS and OS to provision the wireless pairing information on both the BIOS and OS before receiving the wireless advertising packet; and
  then placing the information handling system in the state with the host programmable integrated circuit turned off and unpowered and with the BIOS and the OS not awake and not executing on the information handling system.

12. The method of claim 1, further comprising verifying that the received wireless advertising packet is a wireless I/O wake request from the wireless peripheral device based on one or more packet characteristics of the wireless advertising packet as a precondition for turning on and powering the host programmable integrated circuit.

13. The method of claim 1, where the wireless peripheral device is a wireless keyboard, wireless mouse, wireless game controller, wireless pen, wireless totem, wireless touchpad or wireless smart phone.

14. The method of claim 1, further comprising verifying the identity of the wireless peripheral device and/or user of the wireless peripheral device before turning on and powering the host programmable integrated circuit and waking and executing the BIOS and OS of the information handling system when a sensed proximity between a user and/or wireless peripheral device to the information handling system is greater than a predesignated maximum threshold distance; and not verifying the identity of the wireless peripheral device and/or user of the wireless peripheral device before turning on and powering the host programmable integrated circuit and waking and executing the BIOS and OS of the information handling system when a sensed proximity between a user and/or wireless peripheral device to the information handling system is less than the predesignated maximum threshold distance.

15. The method of claim 1, where the pre-designated packet characteristic/s comprise packet length.

16. The method of claim 1, where the pre-designated packet characteristic/s comprise data format.

17. The method of claim 1, where the pre-designated packet characteristic/s comprise packet length and data format.

18. A system, comprising:
  an information handling system comprising a first programmable integrated circuit separate from and coupled to a host programmable integrated circuit of the system, the host programmable integrated circuit being programmed to execute a basic input/output system (BIOS) and an operating system (OS); and
  a radio coupled between an antenna and the first programmable integrated circuit of the information handling system;
  where the first programmable integrated circuit is programmed to:
    receive via the radio a wireless advertising packet as a wireless input/output (I/O) wake request from a wireless peripheral device that is separate from the information handling system, the wireless I/O wake request being received at the same time that the host programmable integrated circuit is turned off and unpowered and the BIOS and OS of the information handling system are not awake and executing on the information handling system, and
    then turn on and power the host programmable integrated circuit and wake and execute the BIOS and OS of the information handling system in response to receipt of the wireless I/O wake request from the wireless peripheral device;
  where the host programmable integrated circuit comprises a central processing unit (CPU) and the first programmable integrated circuit comprises a separate microcontroller coupled between the radio and the CPU;
  where the system further comprises an embedded controller (EC) coupled between the CPU and the separate microcontroller;
  where the separate microcontroller is programmed to:
    remain active and awake to receive the wireless I/O wake request via the radio while both the EC and the CPU is turned off and unpowered,
    verify while the EC and CPU remain turned off and unpowered that the received wireless advertising packet is a type of wireless advertising packet having pre-designated packet characteristic/s that qualify the received wireless advertising packet as an approved wireless I/O wake request,
    turn on and power the EC while the CPU remains turned off and unpowered only if the separate microcontroller verifies that the received wireless advertising packet has the pre-designated packet characteristic/s that qualify the received wireless advertising packet as an approved wireless I/O wake request; and
  where the EC is programmed to respond to being turned on and powered by the separate microcontroller by then turning on and powering the CPU to wake and execute the BIOS and OS of the information handling system.

19. The system of claim 18, further comprising the wireless peripheral device, the wireless peripheral device accepting a user input action and transmitting the wireless advertising packet from the wireless peripheral device in response to the user input action; where the wireless peripheral device is a wireless keyboard, wireless mouse, wireless game controller, wireless pen, wireless totem, wireless touchpad, or wireless smart phone.

20. The system of claim 18, where the first programmable integrated circuit is programmed to:
  verify the identity of the wireless peripheral device and/or user of the wireless peripheral device before turning on and powering the host programmable integrated circuit and waking and executing the BIOS and OS of the host information handling system by authenticating the wireless I/O wake request at the information handling system using security keys and/or identity information previously stored in non-volatile storage on the information handling system; and
  then only turn on and power the host programmable integrated circuit and wake and execute the BIOS and OS of the information handling system upon successful authentication of the wireless OS wake request.

21. The system of claim 20, where the host programmable integrated circuit is programmed to perform the following before the information handling system receives the wireless advertising packet:
  execute the BIOS of the information handling system to retrieve wireless pairing information from the wireless peripheral device in a pre-boot environment, or boot and execute the OS of the information handling system to retrieve wireless pairing information from the wireless peripheral device in a post-boot environment, the wireless pairing information comprising the security keys and/or identity information;

then store the security keys and/or identity information in a registry of the OS on the non-volatile storage of the information handling system; and then place the information handling system in the state with the host programmable integrated circuit turned off and unpowered and with the BIOS and the OS not awake and not executing on the information handling system.

22. The system of claim 20, where the host programmable integrated circuit is programmed to perform the following before the information handling system receives the wireless advertising packet:

retrieve the security keys and identity information from a server;

then store the security keys and identity in a registry of the OS on the non-volatile storage of the information handling system; and then place the information handling system in the state with the host programmable integrated circuit turned off and unpowered and with the BIOS and the OS not awake and not executing on the information handling system.

23. The system of claim 18, where the host programmable integrated circuit is programmed to perform the following before the information handling system receives the wireless advertising packet:

retrieve wireless pairing information from the wireless peripheral device or a server;

then synchronize the wireless pairing information between the BIOS and OS to provision the wireless pairing information on both the BIOS and OS before receiving the wireless advertising packet; and then place the information handling system in the state with the host programmable integrated circuit turned off and unpowered and with the BIOS and the OS not awake and not executing on the information handling system.

24. The system of claim 18, where the first programmable integrated circuit is programmed to:

verify the identity of the wireless peripheral device and/or user of the wireless peripheral device before turning on and powering the host programmable integrated circuit and waking and executing the BIOS and OS of the information handling system when a sensed proximity between a user and/or wireless peripheral device to the information handling system is greater than a predesignated maximum threshold distance; and not verify the identity of the wireless peripheral device and/or user of the wireless peripheral device before turning on and powering the host programmable integrated circuit and waking and executing the BIOS and OS of the information handling system when a sensed proximity between a user and/or wireless peripheral device to the information handling system is less than the predesignated maximum threshold distance.

25. The system of claim 18, where the pre-designated packet characteristic/s comprise packet length.

26. The system of claim 18, where the pre-designated packet characteristic/s comprise data format.

27. The system of claim 18, where the pre-designated packet characteristic/s comprise packet length and data format.

* * * * *